(12) United States Patent
Meyer et al.

(10) Patent No.: US 12,045,475 B1
(45) Date of Patent: Jul. 23, 2024

(54) RESIZABLE SCRATCHPAD MEMORY

(71) Applicant: Amazon Technologies, Inc., Seattle, WA (US)

(72) Inventors: Paul Gilbert Meyer, Jericho, VT (US); Patricio Kaplan, Palo Alto, CA (US); Sundeep Amirineni, Cedar Park, TX (US); Laura Sharpless, Sunnyvale, CA (US); Ron Diamant, Santa Clara, CA (US); Akshay Balasubramanian, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/457,502

(22) Filed: Dec. 3, 2021

(51) Int. Cl.
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/064* (2013.01); *G06F 3/0656* (2013.01); *G06F 3/0659* (2013.01); *G06F 3/0679* (2013.01); *G06F 12/0246* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 6,687,870 B1* | 2/2004 | Mohseni | H03M 13/2782 711/217 |
| 10,552,336 B2* | 2/2020 | Yoshida | G06F 12/1009 |
| 2008/0109704 A1* | 5/2008 | Christenson | G06F 11/1048 714/766 |
| 2012/0271985 A1* | 10/2012 | Jeong | G06F 12/0238 711/E12.001 |
| 2019/0303304 A1* | 10/2019 | Lee | G06F 12/1466 |
| 2019/0377681 A1* | 12/2019 | Hodes | G06F 12/0848 |
| 2019/0384714 A1* | 12/2019 | Kaleeluddin | G06F 12/0891 |
| 2021/0358559 A1* | 11/2021 | Suh | G06F 11/10 |
| 2022/0206711 A1* | 6/2022 | Balakrishnan | G10L 19/167 |

* cited by examiner

*Primary Examiner* — Nanci N Wong
(74) *Attorney, Agent, or Firm* — Weaver Austin Villeneuve & Sampson LLP

(57) ABSTRACT

Techniques for implementing a dynamically resizable memory region for alternative use in a memory are described. The techniques may include using two concurrent address maps corresponding to two address ranges for a memory represented as an array of memory blocks. The first address range can be mapped to the memory with starting addresses of the memory blocks incrementing sequentially along each row. The second address range can be mapped to the memory with starting addresses of the memory blocks incrementing sequentially along each column. When an access request is received having a target address belonging to the first address range, the target address is provided as the memory address to access the memory. When an access request having a target address belonging to the second address range, the target address is translated by address translation logic into a memory address to access the memory.

21 Claims, 12 Drawing Sheets

RESIZABLE SCRATCHPAD MEMORY

BACKGROUND

Integrated circuit devices such as processors and accelerators generally have one or more execution engines to perform high throughput computations. Such integrated circuit devices typically have on-chip memory to store data with low access latency. The on-chip memory can be used, for example, to store frequently accessed data and/or data being loaded into the execution engines. However, the capacity of the on-chip memory can be limited to balance between the physical area of the chip and storage capacity. To provide additional storage capacity, such integrated circuit devices may also have access to off-chip system memory such as dynamic random access memory (DRAM). Although system memory can have a greater storage capacity as compared to the on-chip memory, the access latency to system memory can be much longer than the on-chip memory, and frequent accesses to system memory can reduce the computational throughput of the system.

BRIEF DESCRIPTION OF THE DRAWINGS

Various embodiments in accordance with the present disclosure will be described with reference to the drawings, in which.

DETAILED DESCRIPTION

Figure 1:
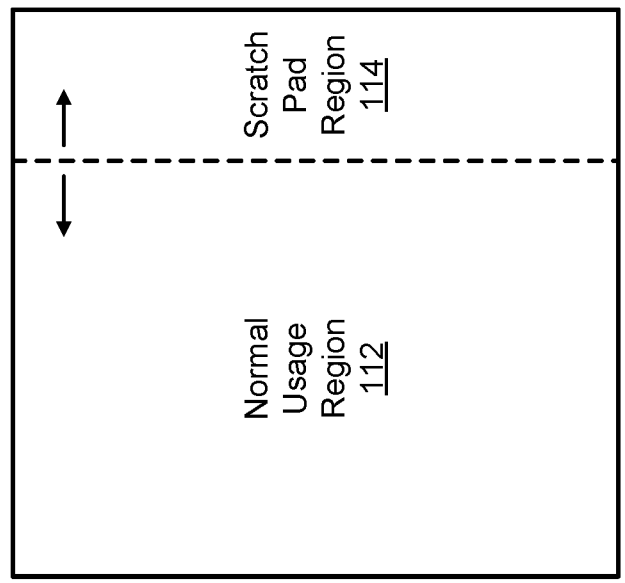
FIG. 1 illustrates a conceptual diagram of an example of a memory.
Figure 1:
Figure 1:
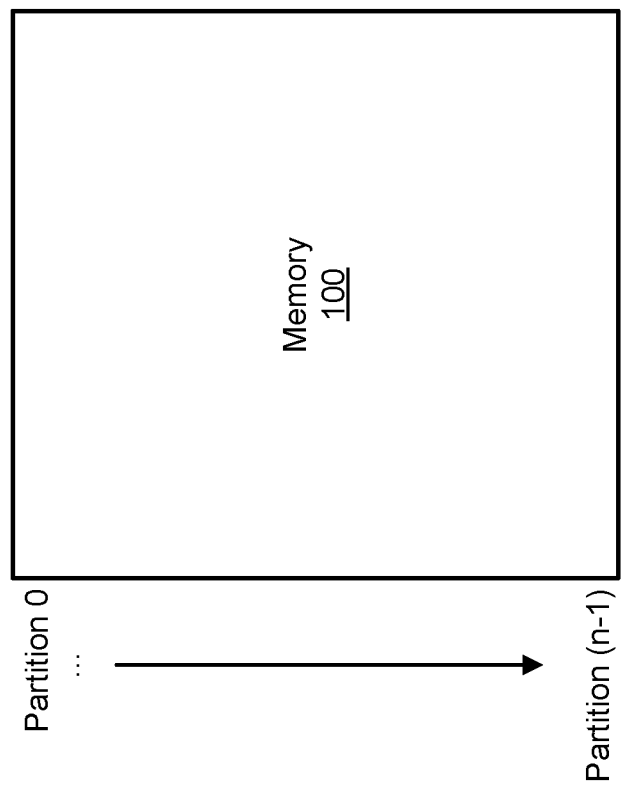

The storage capacity of on-chip memory is typically chosen to provide certain performance for the execution engine of the integrated circuit device while balancing other factors such as the physical area of the chip. However, utilization of the on-chip memory can vary depending on the specific tasks and/or computations being performed by the execution engine of the integrate circuit device. In some instances, other components of the system can benefit from using the unutilized portion of the on-chip memory as a scratchpad memory. For example, the scratchpad memory can be used for temporary storage of calculations, work-in-progress data, or other suitable data for tasks or processes (e.g., formatting data) that may otherwise use the system memory for storage. By implementing a scratchpad memory region in an unused portion of the on-chip memory, the access latency for data that would otherwise be stored in system memory can be reduced.

One way to reserve space in the on-chip memory for a scratchpad memory region is to allocate certain partitions of the on-chip memory for the scratchpad. However, doing so may complicate how software is executed on the integrated circuit device. For example, an accelerator such as a neural network processor may include an execution engine in the form of a processing engine array, and the on-chip memory of the accelerator may include a number of partitions corresponding to the number of rows in the processing engine array. During normal execution, each partition may store data for loading into each row of the processing engine array, and software executing on the accelerator may perform parallel reads to load data from every partition of the on-chip memory into respective rows of the processing engine array. If certain partitions are taken away and allocated for other uses such as a scratchpad region, there will be fewer partitions than the number of rows in the processing engine array, and parallel data loading into the processing engine array may no longer be possible. Furthermore, software workarounds may need to be implemented to load data from the same partition into different rows of the processing engine array because with fewer partitions, multiple rows may share the same partition.

The techniques disclosed herein provide a mechanism to allocate part of a memory for scratchpad usage by using two concurrent address maps for the memory. The two address maps allow the scratchpad region to occupy a contiguous cross section of memory that is formed from portions of each partition of the memory such that the number of partitions in the memory can be preserved for normal usage. Memory accesses for normal usage such as for writing and reading data for loading into an execution engine can be performed using the first address map, and memory accesses for scratchpad usage can be performed using the second address map. An address translation circuit can be implemented in hardware to translate target addresses of the second address map to memory addresses to access the memory. The use of two address maps also allows for the size of the scratchpad memory region to be adjusted dynamically by adjusting which addresses in the two address maps are valid and allowed to access the memory.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 is a conceptual diagram illustrating a memory 100. Memory 100 can be an on-chip memory that provides data to an execution engine of an integrated circuit device. For example, in implementations in which the integrated circuit device is a neural network processor, memory 100 can be a state buffer memory that stores computational data such as input feature map data, intermediate results, and/or weight values for loading into a processing engine array (e.g., a systolic array). Memory 100 may include n number of partitions (e.g., Partition 0 to Partition (n−1), and each partition may correspond to a row of the processing engine array. During normal execution, parallel reads can be performed to concurrently load data from every partitioned into their respective row in the processing engine array to perform neural network computations such as matrix multiplication operations. Depending on the neural network model being executed, and/or the neural network layer of a model being executed, not all of memory 100 may be needed. For example, some layers of a neural network model may process fewer feature maps than other layers, and as a result, those layers may demand less space in memory 100 to execute. Likewise, some neural network models may have fewer layers or smaller weight matrices, and thus may demand less space in memory 100 to execute.

Hence, in some scenarios, memory 100 can be underutilized for certain periods of time. Other components of the system can benefit from using the unused portion of memory 100 as a scratchpad memory to improve access latency and avoid having to access system memory. To retain the same number of partitions such that parallel loading of data into the execution engine can still be performed, instead of allocating entire partitions for use as a scratchpad, a cross section of memory 100 cutting across every partition can be allocated for the scratchpad.

By way of illustration, referring to FIG. 1, memory 100 can be divided into a normal usage region 112 and a scratchpad region 114. The normal usage region 112 is allocated, for example, for storing computational data for loading into the processing engine array. The normal usage region 112 still spans every partition from Partition 0 to Partition (n−1), but the last section of each partition is allocated for the scratchpad region 114. In other words, scratchpad region 114 is a contiguous region of memory 100 that is formed by grouping together the last section of each partition from Partition 0 to Partition (n−1). The scratchpad region 114 can be used as a scratchpad memory to temporarily store calculations, work-in-progress data, or other suitable data for tasks or processes (e.g., formatting data) that may otherwise be stored in system memory.

In addition to dividing memory 100 along the column (vertical) direction to preserve the number of partitions allocated for normal usage, the techniques disclosed herein also allow the size of scratchpad region 114 to be dynamically adjusted. For example, when execution switches to a neural network layer that utilizes more of memory 100, scratch pad region 114 can shrink to a smaller size to provide more storage capacity for normal usage region 112. Likewise, when execution switches to a neural network layer that utilizes less of memory 100, scratchpad region 114 can expand to a larger size to reduce the storage capacity for normal usage region 112 and increase the storage capacity of scratchpad region 114. Similar adjustments can be made when switching between neural network models.

Although certain aspects of the techniques disclosed herein are described in the context of a neural network processor having a state buffer memory and a processing engine array, it should be understood that the techniques disclosed herein can be used in other types of integrated circuit devices. For example, a cache memory of a processor may include different partitions assigned to different processing cores, a memory of a field programmable gate array (FPGA) may include different partitions for different row of programmable logic blocks, etc. The techniques disclosed herein can be used to dynamically carve out a contiguous region of memory for other usage without impacting the one-to-one relationship between a processing unit (e.g., a processing core, a row of an array, etc.) and the corresponding memory partition. Furthermore, although the address mapping scheme is described as being applied to an on-chip memory, the address mapping scheme can be used in other memories including system memory.

Figure 2A:
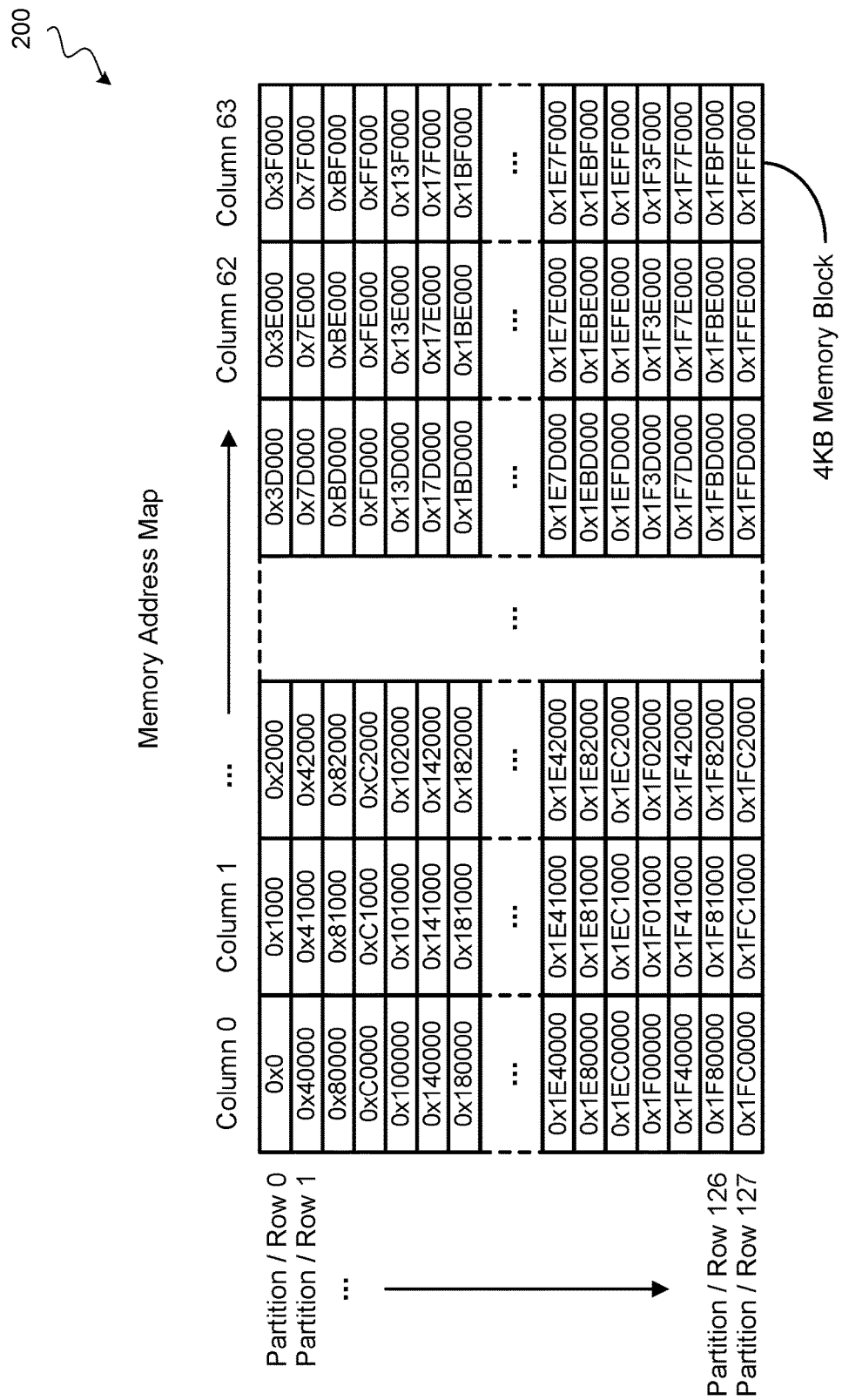
FIG. 2A illustrates a first example of a memory address map.
Figure 2B:
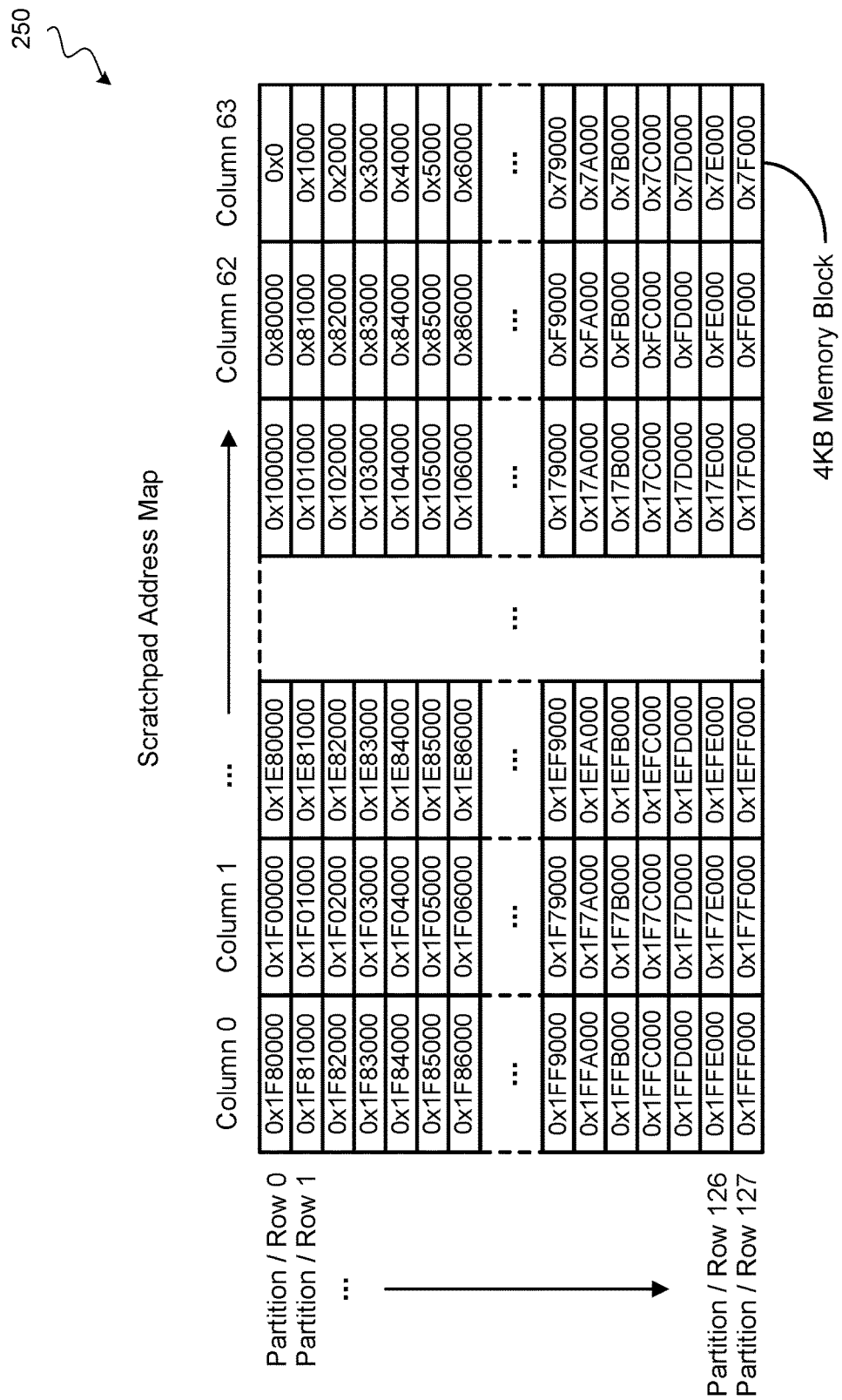
FIG. 2B illustrates a first example of a scratchpad address map.

FIGS. 2A and 2B illustrate an example of two respective address maps 200 and 250 for a memory (e.g., memory 100) that can be utilized in an integrated circuit device to provide the flexible scratchpad allocation described herein. By way of illustration, the memory shown in FIGS. 2A and 2B is a 32 MB memory organized as 128 partitions. Each partition has a storage capacity of 256 KB, and each partition can be represented as a row. Each partition or each row can further be represented as 64 columns of memory blocks, with each memory block having a storage capacity of 4 KB. Accordingly, the memory shown in each of FIGS. 2A and 2B can be represented as an array of 4 KB memory blocks arranged in 128 rows and 64 columns. It should be understood that in other implementations, the memory may have a different overall storage capacity, different number of partitions/rows, different number of columns, and/or different memory block size.

Referring now to FIG. 2A, memory address map 200 is used for normal addressing of the memory (e.g., to access the normal usage region of the memory) and shows the starting addresses for each memory block of the memory. The addresses shown in FIG. 2A are local byte addresses for the memory, and are the physical addresses provided to the memory to access the memory. For a 32 MB memory, the local address can range from 0x0 to 0x1FFFFFF, and 25 address bits ADDR[24:0] are used to address each byte of the memory. Within each memory block, 12 address bits ADDR[11:0] are used to address each byte of the 4 KB memory block.

The first local address of 0x0 is the starting address of the first memory block at Partition/Row 0 and Column 0. The starting addresses of the memory blocks increment sequentially along each row. In other words, address bits ADDR[24:12], which are used to address each memory block, increments sequentially along each row from left to right. Hence, the next sequential starting address of 0x1000 is mapped to the next memory block along the same row at Partition/Row 0 and Column 1. Similarly, the 64$^{th}$ sequential starting address is 0x3F000, and is mapped to the last memory block of the same row at Partition/Row 0 and Column 63. The next starting address of 0x40000 is mapped to the first column of the next row at Partition/Row 1 and Column 0, and so on.

Accordingly, of the 25 address bits ADDR[24:0] used for the local addressing of the memory according to memory address map 200, the 12 lower address bits ADDR[11:0] are used to address the location within a memory block. The six middle address bits ADDR[17:12] are used to walk across the memory blocks of each row from left to right. In other words, the six middle address bits ADDR[17:12] are used to address different columns of memory blocks of each row. The seven upper address bits ADDR[24:18] are used to walk down the memory blocks of each column. In other words, the seven upper address bits ADDR[24:18] are used to address different rows of memory blocks of each column.

Referring now to FIG. 2B, scratchpad address map 250 is used for addressing the scratchpad region of the memory and shows the starting addresses for each memory block of the memory. In contrast to memory address map 200, the address mapping of scratchpad address map 250 begins at the last column of the first row and traverses down each column starting at column 63 and then back towards column 0.

The first local address of 0x0 is the starting address of the last memory block of the first row at Partition/Row 0 and Column 63. The starting addresses of the memory blocks increment sequentially along each column. In other words, address bits ADDR[24:12], which are used to address each memory block, increments sequentially along each column from top to bottom. Hence, the next sequential starting address of 0x1000 is mapped to the next memory block along the same column at Partition/Row 1 and Column 63. Similarly, the 128$^{th}$ sequential starting address is 0x7F000 and is mapped to the last memory block of the same column at Partition/Row 127 and Column 63. The next starting address of 0x80000 is mapped to the first row of the next column at Partition/Row 0 and Column 62, and so on.

Accordingly, of the 25 address bits ADDR[24:0] used for the local addressing of the memory according to scratchpad address map 250, the 12 lower address bits ADDR[11:0] are used to address the location within a memory block. The seven middle address bits ADDR[18:12] are used to walk down the memory blocks of each column. In other words, the seven middle address bits ADDR[18:12] are used to address different rows of memory blocks of each column. The six upper address bits ADDR[24:19] are used to walk across the memory blocks of each row from right to left. In other words, the six upper address bits ADDR[24:19] are used to address different columns of memory blocks of each row.

By using the address mapping of scratchpad address map 250, a contiguous memory region of one or more end columns of memory blocks can be allocated for the scratchpad memory. For instance, to allocate 1 MB of the memory for the scratchpad region, the last two end columns (e.g., Column 63 and Column 62) can be reserved for the scratchpad. The memory blocks of these two columns can be accessed with the contiguous local address range of 0x0 to 0xFFFFFF using scratchpad address map 250.

Given the two local address maps (memory address map 200 for normal usage region, and scratchpad address map 250 for scratchpad region), the memory can be divided into the two regions by assigning a memory base address to the normal usage region and a scratchpad base address to the scratchpad region. The base address may occupy the upper address bits of the system level addresses. For example, in a system that uses 64-bit addressing, ADDR[63:25] can be used to represent the base address of these memory regions.

The selection of which address map is used for a particular access request can be determined by the base address of the access request. For instance, when an agent (e.g., a hardware component or software) is accessing the normal usage region, the agent can issue an access request using a target address being the concatenation of the memory base address and a local address according to memory address map 200. An address translation circuit can determine that the target address contains the memory base address, and provide the target address as the memory address to access the memory, because the local addresses of memory address map 200 are the physical addresses provided to the memory to access the memory. In other words, the address translation circuit may pass through the target address without translation for access requests containing the memory base address.

When an agent (e.g., a hardware component or software) is accessing the scratchpad memory region, the agent can issue an access request using a target address being the concatenation of the scratchpad base address and a local address according to scratchpad address map 250. The address translation circuit can determine that the access request is for the scratchpad memory region based on the scratchpad base address, and translate the target address into a memory address to access the memory. The address translation will be explained in further detail with reference to FIG. 2C.

By way of illustration, suppose the memory base address is MEMORY BASE ADDR[63:25]=0x10 and the scratchpad base address is SCRATCHPAD BASE ADDR[63:25] =0x20. The full address range for the normal usage region if the normal usage region occupies the entire memory is 0x20000000 to 0x21FFFFFF, and the full address range for the scratchpad region if the scratchpad region occupies the entire memory is 0x40000000 to 0x41FFFFFF.

Continuing with the example above, suppose that 1 MB of the memory (the last two end columns of memory blocks at Column 63 and Column 62) are allocated for the scratchpad. Under such a scenario, the scratchpad memory region can be accessed using addresses below the threshold of 0x40100000 in the scratchpad address range. In other words, the valid addresses of the scratchpad address range is 0x40000000 to 0x4000FFFFF, and addresses in the range of 0x40100000 to 0x41FFFFFF are invalid addresses because such addresses exceed the 1 MB size of the scratchpad memory. Similarly, the normal usage region can be accessed using addresses in the ranges of 0x20000000 to 0x2003DFFF for Partition 0, 0x20040000 to 0x2007DFFF for Partition 1, 0x20080000 to 0x200BDFFF for Partition 2, and so on, where the gaps are invalid addresses corresponding to addresses in the last two columns of the memory under memory address map 200.

For instance, an access request to read or write at the beginning of the memory block at Partition/Row 1 and Column 1 of the normal usage region may use a target address of 0x200041000. The upper address bits ADDR[63:25] of 0x10 corresponds to the memory base address, and the lower address bits ADDR[24:0] of 0x0041000 corresponds to the memory block at Partition/Row 1 and Column 1 according to memory address map 200. As another example, an access request to read or write at the beginning of the memory block at Partition/Row 126 and Column 62 of the scratchpad region may use a target address of 0x4000FE000. The upper address bits ADDR[63:25] of 0x20 corresponds to the scratchpad base address, and the lower address bits ADDR[24:0] of 0x00FE000 corresponds to the memory block at Partition/Row 126 and Column 62 according to scratchpad address map 250.

In some implementations, to prevent accesses to the scratchpad region from overwriting contents of the normal usage region, write protection can be applied to prevent access requests with invalid target addresses associated with the scratchpad address map 300 from writing into the normal usage region. For example, the write protection can be applied to prevent write accesses to the memory using an upper portion of the scratchpad address range that exceeds the size of the scratchpad memory. In the example above with the 1 MB scratchpad region, the write protection can prevent writes with a target address in the range of 0x40100000 to 0x41FFFFFF. In other words, write accesses to the memory using target addresses at or above the threshold address of 0x40100000 in the scratchpad address range are blocked by the write protection, whereas accesses to the memory using target addresses below the threshold address of 0x40100000 in the scratchpad address range are allowed.

Similar write protection can be applied to prevent access requests with invalid target addresses associated with the memory address map 200 from writing to the scratchpad region. For example, continuing with the 1 MB scratchpad example above, write protection can prevent write accesses to the memory with target addresses in the range of 0x2003E000 to 0x2003FFFF for Partition 0, 0x2007E000 to 0x2007FFFF for Partition 1, 0x200BE000 to 0x200BFFFF for Partition 2, and so on.

The concurrent use of the two address maps 200 and 250 mapping to the same memory also allows for the size of the scratchpad region to be dynamically adjusted. The size of the scratchpad region can be dynamically adjusted by adjusting the range of valid addresses for the scratchpad address range (e.g., by adjusting the threshold address at which point the addresses of the scratchpad address range becomes invalid). For example, to increase the scratchpad region from 1 MB to 1.5 MB, the threshold address for valid accesses can be adjusted to 0x40180000 such that target addresses in the range of 0x40000000 to 0x4017FFFF are valid addresses for accessing the memory. Target addresses in the range of 0x40180000 to 0x41FFFFFF are invalid addresses for accessing the memory, and access requests to write to these target addresses can be blocked by write protection. As another example, to decrease the scratchpad region from 1 MB to 0.5 MB, the threshold address for valid accesses can be adjusted to 0x40080000 such that target addresses in the range of 0x40000000 to 0x4007FFFF are valid addresses for accessing the memory. Target addresses in the range of 0x40080000 to 0x41FFFFFF are invalid addresses for accessing the memory, and access requests to write to these target addresses can be blocked by write protection. Similar adjustments can be made to the valid and invalid address ranges of the memory address range for accessing the normal usage portion of the memory and to prevent access requests to the normal usage portion from overwriting the scratchpad region.

Figure 2C:
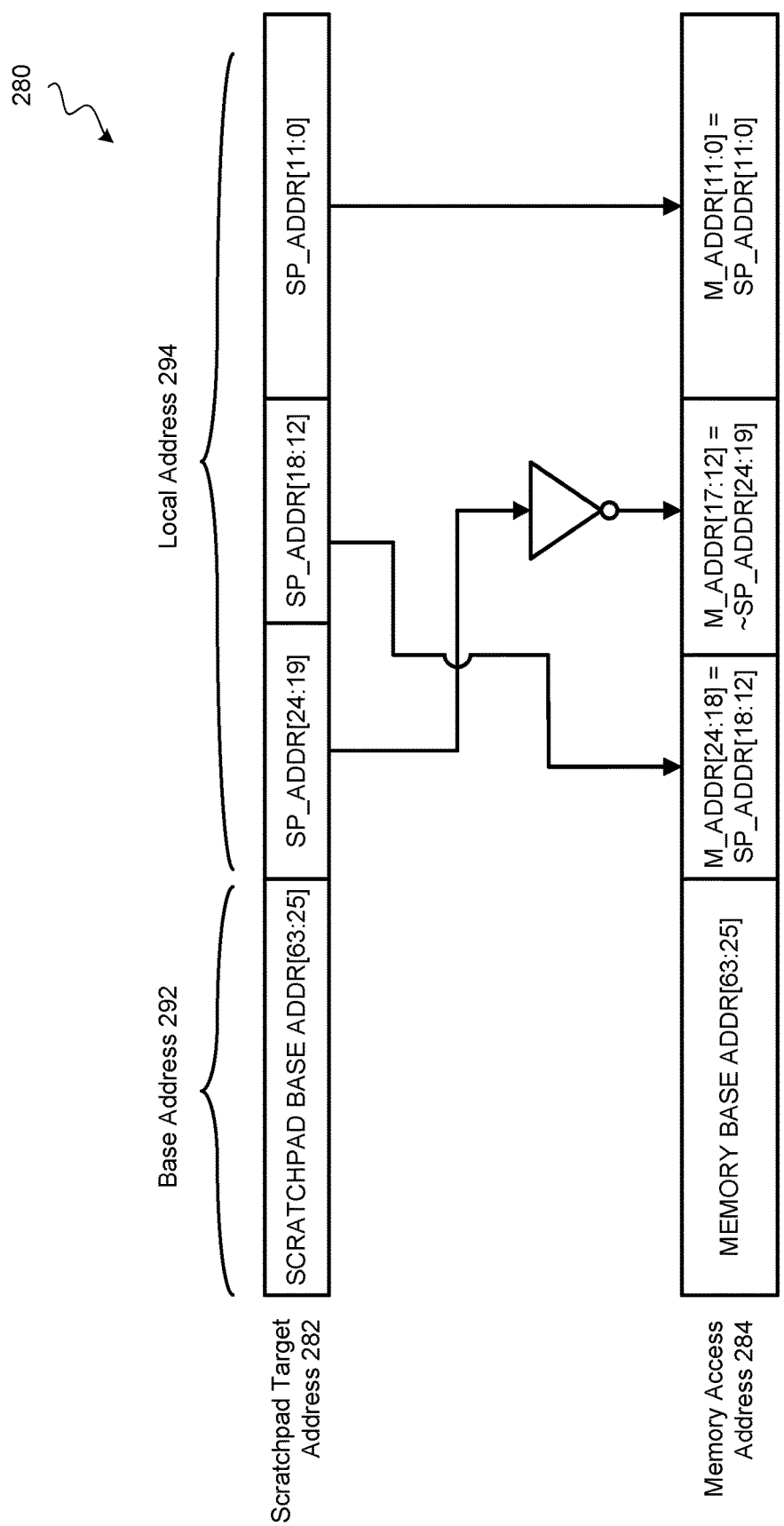
FIG. 2C illustrates an example of address translation logic.

FIG. 2C illustrates an example of the address translation logic 280 that can be implemented in an address translation circuit to translate addresses targeted for the scratchpad region into addresses for accessing the memory. The address bit fields shown in FIG. 2C corresponds to the address maps shown in FIGS. 2A and 2B and described above for a memory represented as 128 rows by 64 columns of 4 KB memory blocks.

Referring to FIG. 2C, when the address translation circuit receives an access request, the address translation circuit can determine whether the access request is targeted for the normal usage region or for the scratchpad region by comparing the base address portion 292 of the target address. If the base address portion 292 (e.g., ADDR[63:25]) of the target address matches the memory base address (e.g., 0x10 in the example above), the address translation circuit can determine that the target address belongs to the memory address range associated with memory address map 200, and the target address can be provided as the memory access address to access the memory without translation. If the base address portion 292 (e.g., ADDR[63:25]) of the target address matches the scratchpad base address (e.g., 0x20 in the example above), the address translation circuit can determine that the target address belongs to the scratchpad address range associated with memory address map 250, and the address translation circuit translates the scratchpad target address into a memory access address for accessing the memory.

To translate a scratchpad target address 282 into a memory access address 284, a local address 294 portion is parsed from the scratchpad target address 282. In this example, the local address 294 portion corresponds to scratchpad address SP_ADDR[24:0], which includes a lower scratchpad address portion SP_ADDR[11:0] that is used to address individual bytes within a memory block, a middle scratchpad address portion SP_ADDR[18:12] that is used to address different rows of memory blocks of the memory along each column, an a upper scratchpad address portion SP_ADDR[24:19] that is used to address different columns of memory blocks of the memory along each row, as explained above with reference to the scratchpad address map 250.

The lower scratchpad address portion SP_ADDR[11:0] is provided as the lower memory access address portion M_ADDR[11:0] without any modification because these address bits are used to address individual bytes within a memory block. The middle scratchpad address portion SP_ADDR[18:12] that is used to address different rows of memory in the scratchpad address map 250 is transposed with an inversion of the upper scratchpad address portion SP_ADDR[24:19] that is used to address different columns of memory blocks in the scratchpad address map 250. In other words, SP_ADDR[18:12] is shifted left to be provided as M_ADDR[24:18], and SP_ADDR[24:19] is inverted (bitwise inversion) and shifted right to be provided as M_ADDR[17:12]. The transposition is performed because the scratchpad address map 250 increments the starting addresses of the memory blocks along each column, whereas the memory access address corresponding to memory address map 200 (which is used to access the memory) increments the starting addresses of the memory blocks along each row. The inversion is performed because the scratchpad address map 250 starts at the last column, whereas the memory access address corresponding to memory address map 200 (which is used to access the memory) starts at the first column.

In addition to manipulating the local address 294 portion, the address translation circuit also replaces the scratchpad base address with the memory base address. Hence, memory access address 284 is generated by concatenating the memory base address (ADDR[63:25]) with the modified local address M_ADDR[24:0] that corresponds to memory address map 200, and memory access address 284 is provided as the physical address to access scratchpad region of the memory. It should be understood that the specific address bits being inverted and transposed can vary depending on the size of each memory block, the number of rows of memory blocks, and/or the number of columns of memory blocks that are implemented in the memory.

Figure 3A:
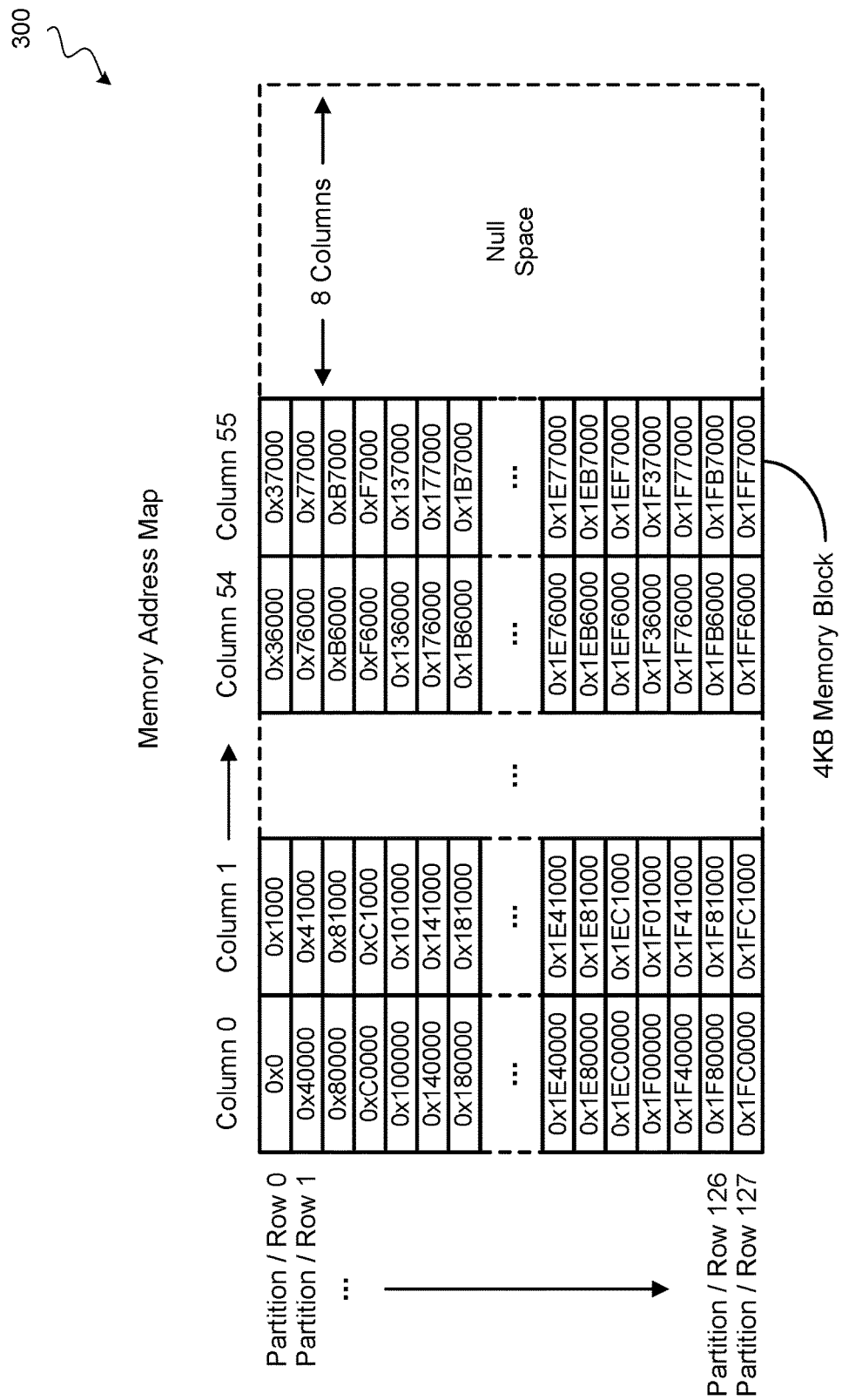
FIG. 3A illustrates a second example of a memory address map.

In some implementations, the actual size of the memory that is mapped to the address range can be smaller than the full address range. This may occur, for example, if the chip area budget puts a constraint on the physical size of the memory. Despite have a smaller size, it can still be convenient to map the memory to the full address range such that each partition starts on a granular address that can be easily handled by software. FIG. 3A illustrates an example of a memory address map 300 for a smaller physical memory.

Similar to the memory of FIG. 2A, the memory being implemented in FIG. 3A has 128 partitions. However, each partition contains 56 columns of 4 KB memory blocks instead of the full 64 columns. Despite having fewer columns of memory blocks, each partition is still memory mapped to a starting address granularity of 0x40000. For example, the first partition at Row 0 starts at address 0x0, the second partition at Row 1 starts at 0x40000, the third partition at Row 2 starts at 0x80000, and so on. In this manner, each partition can be addressed by memory access address bits [24:18], memory blocks or columns within each partition can be addressed using memory access address bits [17:12], and locations within each memory block can be addressed using memory access address bits [11:0]. Such an addressing scheme can allow software to access the different partitions and memory blocks without any significant overhead calculations. As shown in FIG. 3A, maintaining such a memory address map 300 means that there are 8 columns of address space at the end of each partition which are not mapped to any physical memory for a total of 4 MB of null space. Memory access addresses in the null space can be deemed as invalid addresses that are not used by software.

Figure 3B:
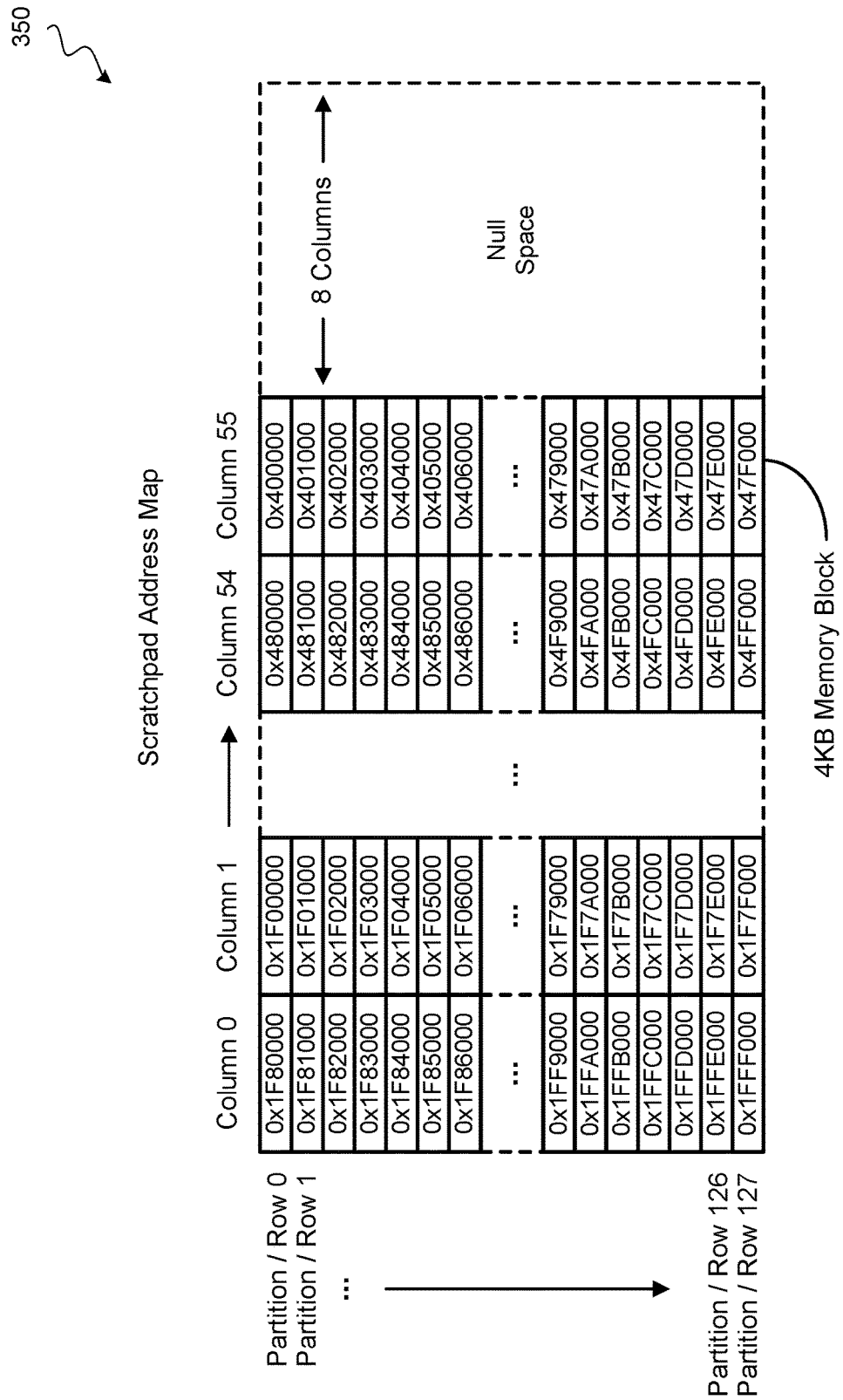
FIG. 3B illustrates a second example of a scratchpad address map.

FIG. 3B illustrates a scratchpad address map 350 that can be used for addressing the scratchpad region of a smaller physical memory corresponding to memory address map 300. As shown in FIG. 3B, the starting addresses of the memory blocks in scratchpad address map 350 are the same as scratchpad address map 250, except that scratchpad addresses 0x0 to 0x3FFFF correspond to the null space which are not mapped to any physical memory. Similar to memory address map 300, scratchpad addresses in the null space can be deemed as invalid addresses. Because the starting addresses of the memory blocks in both scratchpad address map 350 and memory address map 300 are the same as those of scratchpad address map 250 and memory address map 200, respectively, address translation logic 280 shown in FIG. 2C can be used to translate scratchpad addresses in scratchpad address map 350 into the memory addresses of memory address map 300.

Figure 4A:
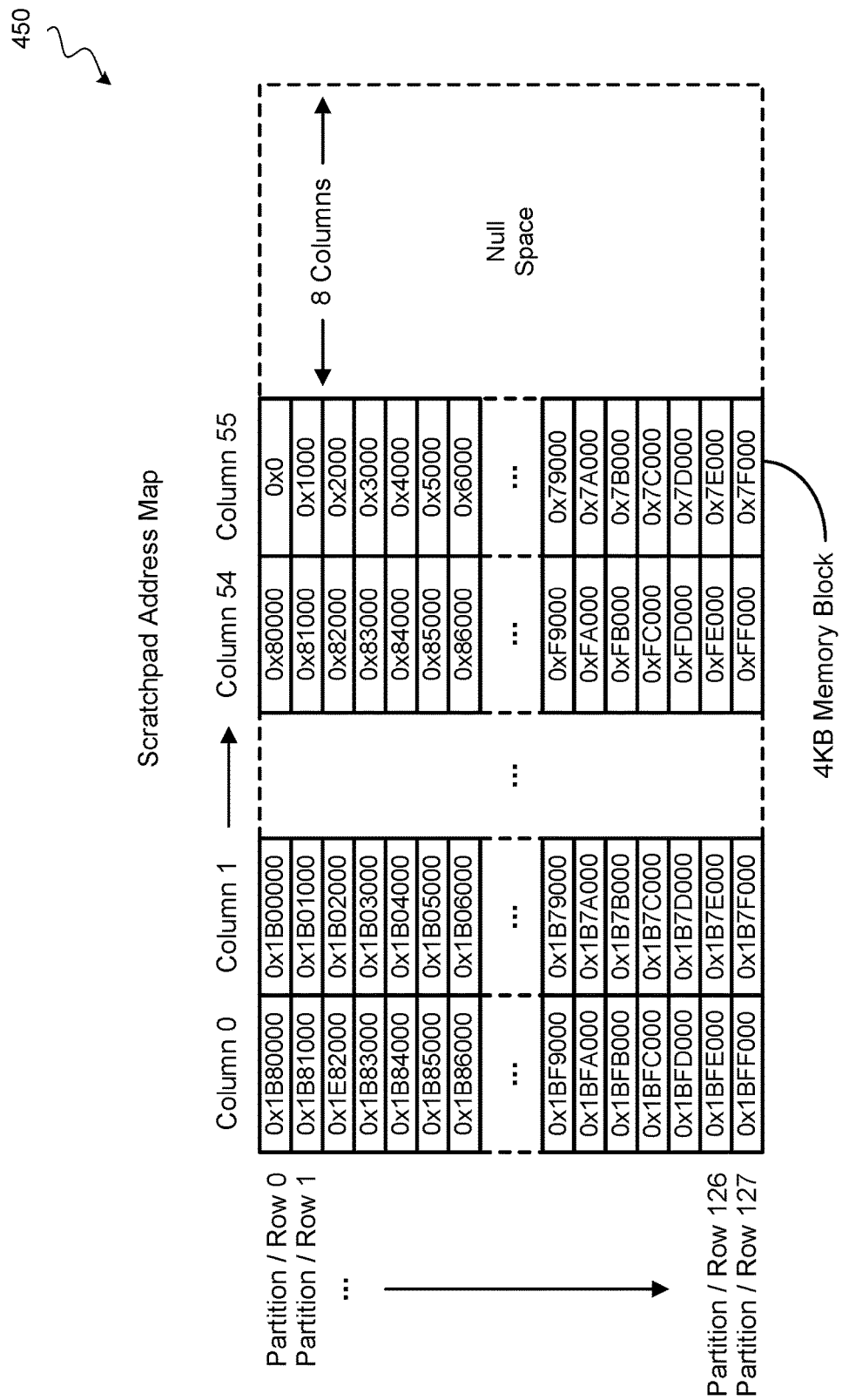
FIG. 4A illustrates a third example of a scratchpad address map.

FIG. 4A illustrates an alternative scratchpad address map 450 that can be used for addressing the scratchpad region of the smaller physical memory corresponding to memory address map 300. Scratchpad address map 450 maps address 0x0 as the starting address of the memory block at Column 55 of the first partition at Row 0. Hence, in contrast to scratchpad address map 350 shown in FIG. 3B, scratchpad address map 450 starts its address range at a physical memory space. As compared to scratchpad address map 350, starting the scratchpad address range in the actual memory can reduce the software complexity when accessing the scratchpad, because the software and hardware components of the system accessing the scratchpad need not add a base address to the target address to properly read and write to the scratchpad. However, because the starting addresses of the memory blocks in scratchpad address map 450 have shifted, the address translation logic is modified to translate scratchpad addresses in scratchpad address map 450 into the memory addresses of memory address map 350.

Figure 4B:
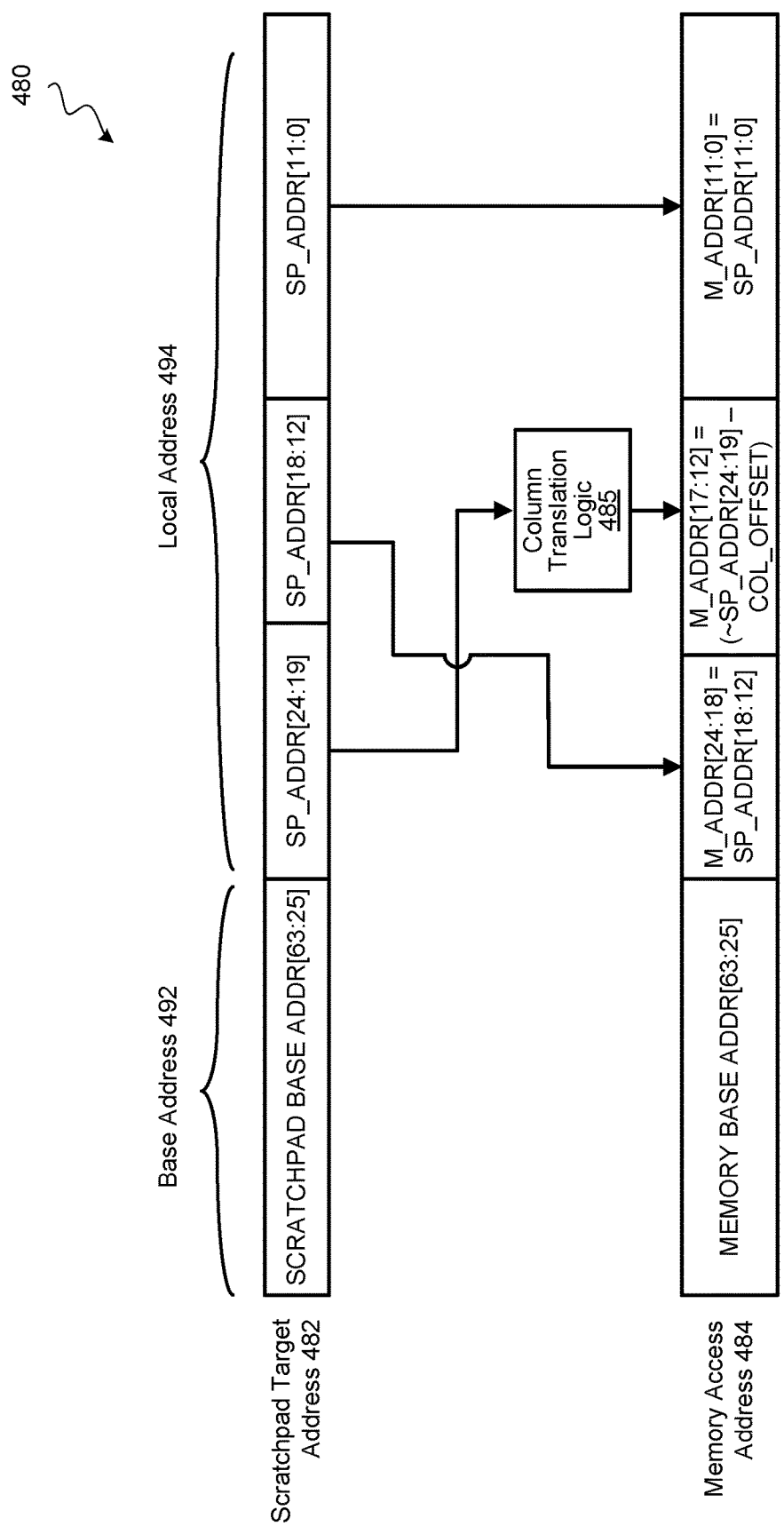
FIG. 4B illustrates another example of address translation logic.

FIG. 4B illustrates an example of address translation logic 480 that can be used to translate target addresses according to scratchpad address map 450 into the memory addresses of memory address map 300. The general operation of address translation logic 480 is similar to address translation logic 280 shown in FIG. 2C, with the exception of column translation logic 485. In address translation logic 280, the column translation logic 485 to modify the upper scratchpad address portion SP_ADDR[24:19] can be implemented using a bitwise inverter to invert all bits of SP_ADDR[24:19] to generate M_ADDR[17:12]. To account for the fewer columns of physical memory, further to inverting SP_ADDR[24:19], a column offset COL_OFFSET representing the number of null columns is also subtracted from the result of inverting SP_ADDR[24:19]. In other words, the transposed memory address M_ADDR[17:12] can be derived as (~SP_ADDR[24:19]−COL_OFFSET). More generally, the target address of a scratchpad access can be translated into the memory address by transposing the portion of the target address that addresses different rows of memory blocks of the memory (e.g., SP_ADDR[18:12]) with a result of applying an offset representing the number of null columns (e.g., −8 for eight null columns) to an inversion of the portion of the target address that addresses different columns of memory blocks of the memory (e.g., ~SP_ADDR[24:19]).

In some implementations, the particular circuitry implemented in column translation logic 485 can be optimized to reduce the amount of logic circuits and layout area. Continuing with the example discussed above, to generate the memory address bits M_ADDR[17:12]=(~SP_ADDR[24:19]−COL_OFFSET), a 6-bit inverter and a 6-bit subtraction circuit can be implemented. However, additional optimization can be achieved if COL_OFFSET is known constant. In the example above, COL_OFFSET[5:0] is 8 or b001000 to represent the 8 null columns. Because the least significant 3 bits of COL_OFFSET are zero, the lower 3 bits of ~SP_ADDR[24:19] do not change when COL_OFFSET is subtracted. Hence, for the lower 3 bits, M_ADDR[14:12] =~SP_ADDR[21:19]−COL_OFFSET[2:0]=~SP_ADDR[21:19], and the logic can be implemented as a 3-bit inverter. For the upper 3 bits, M_ADDR[17:15] can be computed as (~SP_ADDR[24:22]−COL_OFFSET[5:3])=(~SP_ADDR[24:22]−b001). This is logically equivalent to inverting the operands to compute (b110−SP_ADDR[24:22]), which can be implemented using a 3-bit subtraction circuit. Accordingly, in the example shown, column translation logic 485 can be optimized from a 6-bit inverter and 6-bit subtraction circuit to a 3-bit inverter and 3-bit subtraction circuit when COL_OFFSET=8. Similar optimization can be performed for other values of COL_OFFSET representing the number of null columns in different physical memory sizes.

In some implementations, because the upper address range of the scratchpad address map 450 is not mapped to any physical memory, the upper address range of the scratchpad addresses can be deemed as invalid. Alternatively, address translation logic 480 can force scratchpad addresses in the upper address range to stay within the physical memory, for example, by remapping those addresses to access one or more columns of the physical memory.

Figure 5:
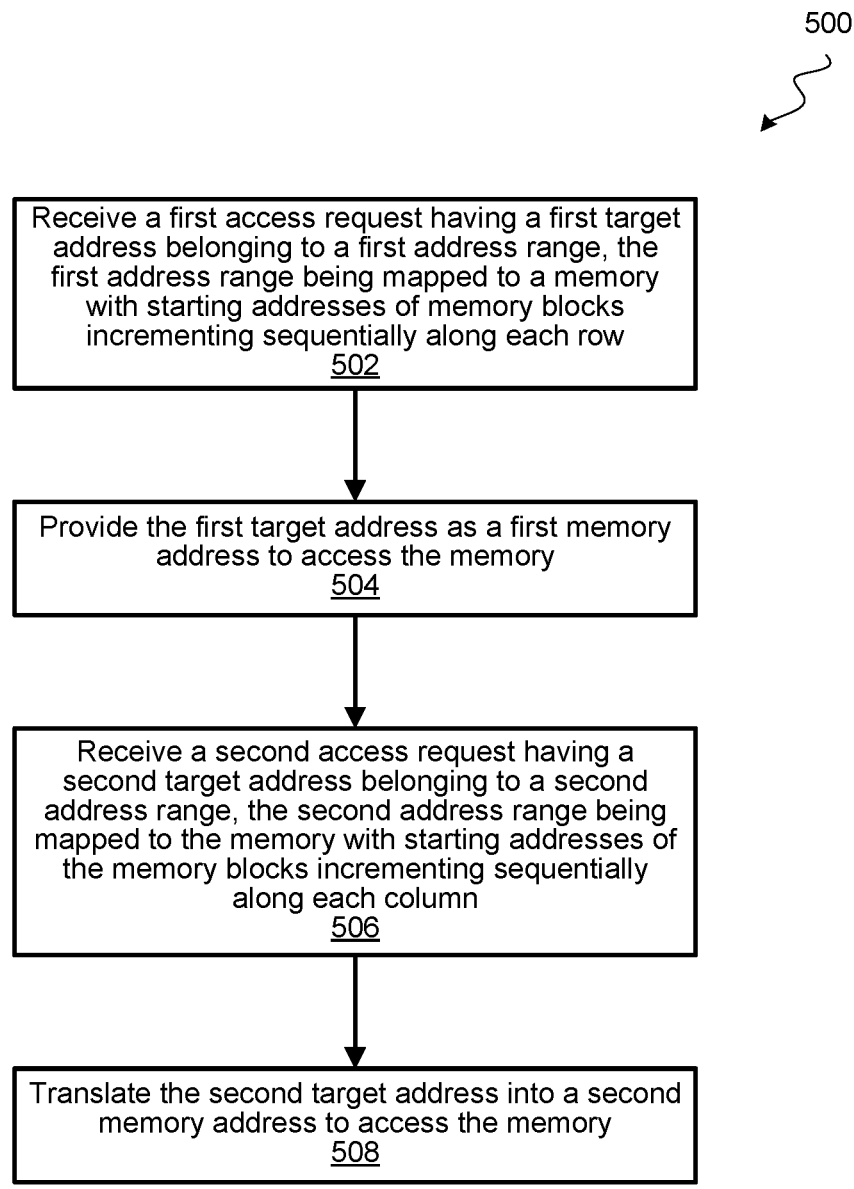
FIG. 5 illustrates a flow diagram of an example of a process for accessing a memory.

FIG. 5 illustrates a flow diagram of an example of a process 500 to access a memory. The memory can be represented as an array of memory blocks arranged in rows and columns. Process 500 can be performed, for example, by an integrated circuit device having a memory that is separated into different regions allocated for different usages. For example, the memory can be a memory such as memory 100 that is separated into a normal usage region and a scratchpad region. In some implementations, the integrated circuit device can be neural network processor or other types of accelerator that has a processing engine array, and the memory can be a state buffer memory. The normal usage region may correspond to a memory region that is operable to store computational data for loading into the processing engine array. The integrated circuit may also include an address translation circuit that is operable to translate a target address of an access request associated with an address mapping used for one of the regions (e.g., scratchpad address map 300 for scratchpad region) to a memory address associated with an address mapping used to access the memory (e.g., memory address map 200 for normal usage region).

Process 500 may begin at block 502 by receiving a first access request having a first target address belonging to a first address range. The first address range can be, for example, the address range that is memory mapped to the memory as physical addresses that are used to access the memory. The first address range can be mapped to the memory with starting addresses of the memory blocks incrementing sequentially along each row of memory blocks. An example of such an address map can be memory address map 200. In some implementations, the first address range can be associated with the normal usage of the memory, and can be used to access the normal usage region of the memory.

At block 504, the first target address is provided as a first memory address to access the memory without translation. For example, an address translation circuit may determine that the target address is accessing the normal usage region, and thus no translation is needed to access the memory with the first target address provided in the first access request. The address translation circuit may determine that the target address is accessing the normal usage region by comparing the base address of the target address with the memory base address associated with the first address range.

At block 506, a second access request having a second target address belonging to a second address range is received. The second address range can be, for example, the address range that is memory mapped to access another region of the memory. The second address range may start at a memory block corresponding to a last memory block of the first row of the memory. The second address range can be mapped to the memory with starting addresses of the memory blocks incrementing sequentially along each column of memory blocks. An example of such an address map can be scratchpad address map 300. In some implementations, the second address range can be used to access the scratchpad region of the memory. The scratchpad region may correspond to a contiguous region formed using a set of one or more end columns of memory blocks in the memory.

At block 508, the second target address is translated into a second memory address to access the memory. For example, the address translation circuit may determine that the target address is accessing a scratchpad region to perform the address translation. The address translation circuit may determine that the target address is accessing the scratchpad region by comparing the base address of the target address with the scratchpad base address associated with the second address range. In some implementations, the second target address can be translated into the second memory address by transposing a first portion of the second target address that addresses different rows of memory blocks of the memory with an inversion of a second portion of the second target address that addresses different columns of memory blocks of the memory. An example of such a translation is shown in FIG. 4.

As described above, the dual address mapping allows the size of the scratchpad region of the memory to be adjusted dynamically. A threshold address can be used to define the size of the scratchpad region. Target addresses below the threshold address can be considered valid addresses to access the scratchpad region, and target address at or above the threshold address can be considered invalid addresses. In other words, the scratchpad region can be accessed using addresses below the threshold address in the second address range. In some implementations, write protection can be applied to prevent write accesses to the memory using addresses at or above the threshold address in the second address range. In other words, write protection can be applied to prevent write accesses to the memory using an upper portion of the second address range that exceeds the size of the scratchpad memory such that the normal usage region is not overwritten with access requests targeted for the scratchpad region. The size of the scratchpad region can be adjusted by adjusting the threshold address defining the size of the scratchpad region and the address range of the write protection.

Figure 6:
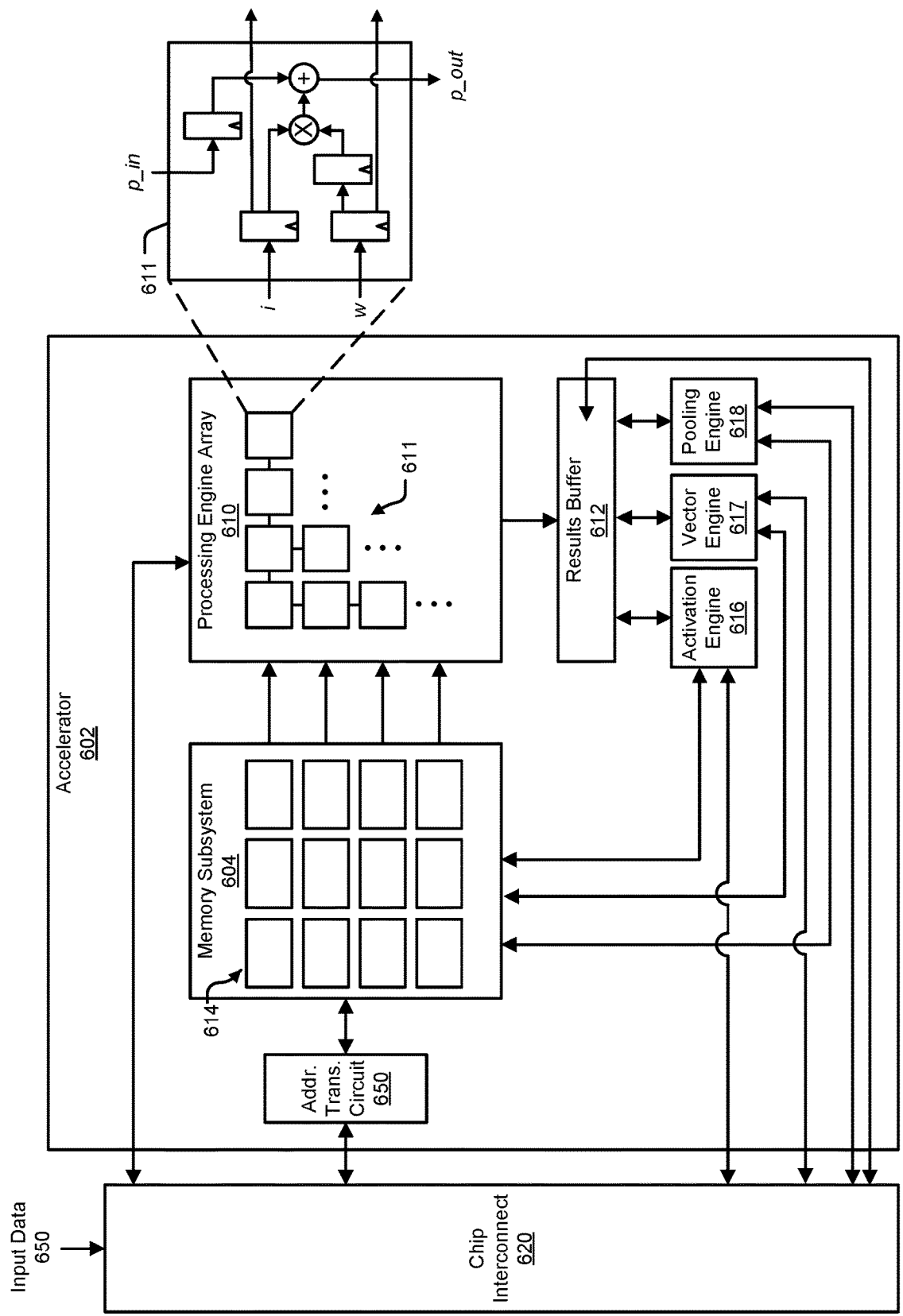
FIG. 6 illustrates a block diagram of an example of an integrated circuit device.

FIG. 6 is a block diagram illustrating an example of an integrated circuit device that can include an accelerator 602. In various examples, the accelerator 602, for a set of input data (e.g., input data 650), can execute computations using various compute engines such as a processing engine array 610, an activation engine 616, a vector engine 617, and/or a pooling engine 618. In some examples, accelerator 602 can be an integrated circuit component of a processor, such as a neural network processor. The processor may have other integrated circuit components, including additional accelerator engines.

In various implementations, the memory subsystem 604 (may also be referred to as a state buffer memory) can include multiple memory banks 614. In these implementations, each memory bank 614 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 614. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 604 can permit simultaneous access to the read or write channels of multiple memory banks. As another example, the memory subsystem 604 can include arbitration logic such that arbitration between, for example, the outputs of multiple memory banks 614 can result in more than one memory bank's output being used. In these and other examples, though globally managed by the memory subsystem 604, each memory bank can be operated independently of any other.

Having the memory banks 614 be independently accessible can increase the efficiency of the accelerator 602. For example, values can be simultaneously read and provided to each row of the processing engine array 610, so that the entire processing engine array 610 can be in use in one clock cycle. As another example, the memory banks 614 can be read at the same time that results computed by the processing engine array 610 are written to the memory subsystem 604. In contrast, a single memory may be able to service only one read or write at a time. With a single memory, multiple clock cycles can be required, for example, to read input data for each row of the processing engine array 610 before the processing engine array 610 can be started.

In various implementations, the memory subsystem 604 can be configured to simultaneously service multiple clients, including the processing engine array 610, the activation engine 616, the vector engine 617, the pooling engine 618, and any external clients that access the memory subsystem 604 over a chip interconnect or communication fabric 620. In some implementations, being able to service multiple clients can mean that the memory subsystem 604 has at least as many memory banks as there are clients. In some cases, each row of the processing engine array 610 can count as a separate client. In some cases, each column of the processing engine array 610 can output a result, such that each column can count as a separate write client. In some cases, output from the processing engine array 610 can be written into the memory banks 614 that can then subsequently provide input data for the processing engine array 610. As another example, the activation engine 616, the vector engine 617, and the pooling engine 618 can include multiple execution (may also be referred to as computational channels), each of which can be separate memory clients. The memory banks 614 can be implemented, for example, using static random access memory (SRAM).

In various implementations, the memory subsystem 604 can include control logic. The control logic can, for example, keep track of the address spaces of each of the memory banks 614, identify memory banks 614 to read from or write to, and/or move data between the memory banks 614. In some implementations, memory banks 614 can be hardwired to particular clients. For example, a set of memory banks 614 can be hardwired to provide values to the rows of the processing engine array 610, with one memory bank servicing each row. As another example, a set of memory banks can be hard wired to receive values from columns of the processing engine array 610, with one memory bank receiving data for each column.

In some implementations, memory subsystem 604 can be represented as an array of memory blocks arranged in rows and columns. Memory subsystem 604 may include a first memory region allocated for storing computational data for loading into the processing engine array 610, in which the first memory region is accessed using a first address map (e.g., address map 200). In other words, the computational data for loading into the processing engine array 610 can be accessed using a target address belonging to a first address range corresponding to the first address map. The first address map may increment starting addresses of the memory blocks sequentially along each row. Memory subsystem 604 may also include a second memory region allocated for a scratchpad memory, the second memory region is accessed using a second address map (e.g., address map 300). The second address map may increment the starting addresses of the memory blocks sequentially along each column. The second memory region may correspond to a set of one or more end columns of memory blocks.

Accelerator 602 may include an address translation circuit 650 that is operable to translate a target address of an access request for accessing the scratchpad memory into a memory address for accessing memory subsystem 604. Memory subsystem 604 can be communicatively coupled between the address translation circuit and the processing engine array 610. Address translation circuit 650 may receive access requests for memory subsystem 640 from the communication fabric 620, and perform address translation (e.g., according to process 500) as needed for access requests targeted for the scratchpad region allocated in memory subsystem 604. In some implementations, write protection can be applied to memory subsystem 640 to prevent access requests with target addresses associated with the first address map from writing to the second memory region, and to prevent access requests with target addresses associated with the second address map from writing to the first memory region. For example, address translation circuit 650 can be configured to drop access requests with an invalid target address. In some implementations, the size of the scratchpad memory can be adjusted for different neural network layers of a neural network model, or for different neural network models The processing engine array 610 is the computation matrix of the example accelerator 602. The processing engine array 610 can, for example, execute parallel integration, convolution, correlation, and/or matrix multiplication, among other things. The processing engine array 610 includes multiple processing engines 611 (may also be referred to as processing elements) arranged in rows and columns, such that results output by one processing engine 611 can be input directly into another processing engine 611. Processing engines 611 that are not on the outside edges of the processing engine array 610 thus can receive data to operate on from other processing engines 611, rather than from the memory subsystem 604.

In various examples, the processing engine array 610 uses systolic execution, in which data arrives at each processing engine 611 from different directions at regular intervals. In some examples, input data can flow into the processing engine array 610 from the left and weight values can be loaded at the top. In some examples weights and input data can flow from the left and partial sums can flow from top to bottom. In these and other examples, a multiply-and-accumulate operation moves through the processing engine array 610 as a diagonal wave front, with data moving to the right and down across the array. Control signals can be input at the left at the same time as weights, and can flow across and down along with the computation.

In various implementations, the number of columns in the processing engine array 610 determines the computational capacity of the processing engine array 610, and the number of rows determines the required memory bandwidth for achieving maximum utilization of the processing engine array 610. The processing engine array 110 can have, for example, 64 columns and 128 rows, or some other number of columns and rows.

An example of a processing engine 611 is illustrated in FIG. 6 in an inset diagram. As illustrated by this example, a processing engine 611 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 611.

In the illustrated example, an input from above can include a partial sum input, pin, provided either from another processing engine 611 or from a previous round of computation by the processing engine array 610. When starting a computation for a new set of input data, the top row of the processing engine array 610 can receive a fixed value for p_in, such as zero. As illustrated by this example, i (e.g., feature map input value) and w (weight value) are multiplied together and the result is summed with p_in to produce a new partial sum output, p_out, which can be input into another processing engine 611. Various other implementations of the processing engine 611 are possible.

Outputs from the last row in the processing engine array 610 can be temporarily stored in the results buffer 612. The results can be intermediate results, which can be written to the memory banks 614 to be provided to the processing engine array 610 for additional computation. Alternatively, the results can be final results, which, once written to the memory banks 614 can be read from the memory subsystem 604 over the communication fabric 620, to be output by the system.

In some implementations, the accelerator 602 includes an activation engine 616. In these implementations, the activation engine 616 can combine the results from the processing engine array 610 into one or more output activations. For example, for a convolutional neural network, convolutions from multiple channels can be summed to produce an output activation for a single channel. In other examples, accumulating results from one or more columns in the processing engine array 610 may be needed to produce an output activation for a single node in the neural network. In some examples, activation engine 616 can be bypassed.

In various examples, the activation engine 616 can include multiple separate execution channels. In these examples, the execution channels can correspond to the columns of the processing engine array 610, and can perform an operation on the outputs of a column, the result of which can be stored in the memory subsystem 604. In these examples, the activation engine 616 may be able to perform between 1 and n parallel computations, where n is equal to the number of columns in the processing engine array 610. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 602 can include a pooling engine 618. Pooling is the combining of outputs of the columns of the processing engine array 610. Combining can include for example, computing a maximum value, a minimum value, an average value, a median value, a summation, a multiplication, or another logical or mathematical combination. In various examples, the pooling engine 618 can include multiple execution channels that can operating on values from corresponding columns of the processing engine array 610. In these examples, the pooling engine 618 may be able to perform between 1 and n parallel computations, where n is equal to the number of columns in the processing engine array 610. In various examples, execution channels of the pooling engine 618 can operate in parallel and/or simultaneously. In some examples, the pooling engine 618 can be bypassed.

In some implementations, the accelerator 602 can further include a vector engine 617. Vector engine 617 is a compute engine that can perform computations and manipulations on values stored in memory subsystem 604 and/or results buffer 612 such as values representing matrices of input values, weight values, intermediate results, etc. Vector engine 617 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 617 can operate in parallel and/or simultaneously. In some examples, the vector engine 617 can be bypassed or be omitted.

Herein, the activation engine 616, the vector engine 617, and the pooling engine 618 may be referred to collectively as execution engines. The processing engine array 610 is another example of an execution engine. Another example of an execution engine is a Direct Memory Access (DMA) engine, which may be located outside the accelerator 602.

Input data 650 can arrive over the communication fabric 620. The communication fabric 620 can connect the accelerator 602 to other components of a processor, such as a DMA engine that can obtain input data 650 from an Input/Output (I/O) device, a storage drive, or a network interface. The input data 650 can be, for example one-dimensional data, such as a character string or numerical sequence, or two-dimensional data, such as an array of pixel values for an image or frequency and amplitude values over time for an audio signal. In some examples, the input data 650 can be three-dimensional, as may be the case with, for example, the situational information used by a self-driving car or virtual reality data. In some implementations, the memory subsystem 604 can include a separate buffer for the input data 650. In some implementations, the input data 650 can be stored in the memory banks 614 when the accelerator 602 receives the input data 650.

In some examples, the accelerator 602 can implement a neural network processing engine. In these examples, the accelerator 602, for a set of input data 650, can execute a neural network to perform a task for which the neural network was trained. Executing a neural network on a set of input data can be referred to as inference or performing inference.

The weights for the neural network can be stored in the memory subsystem 604, along with input data 650 on which the neural network will operate. The neural network can also include instructions, which can program the processing engine array 610 to perform various computations on the weights and the input data. The instructions can also be stored in the memory subsystem 604, in the memory banks 614 or in a separate instruction buffer. The processing engine array 610 can output intermediate results, which represent the outputs of individual layers of the neural network. In some cases, the activation engine 616, the vector engine 617, and/or pooling engine 618 may be enabled for computations called for by certain layers of the neural network. The accelerator 602 can store the intermediate results in the memory subsystem 604 for inputting into the processing engine array 610 to compute results for the next layer of the neural network. The processing engine array 610 can further output final results from a last layer of the neural network. The final results can be stored in the memory subsystem 604 and then be copied out to host processor memory or to another location.

Figure 7:
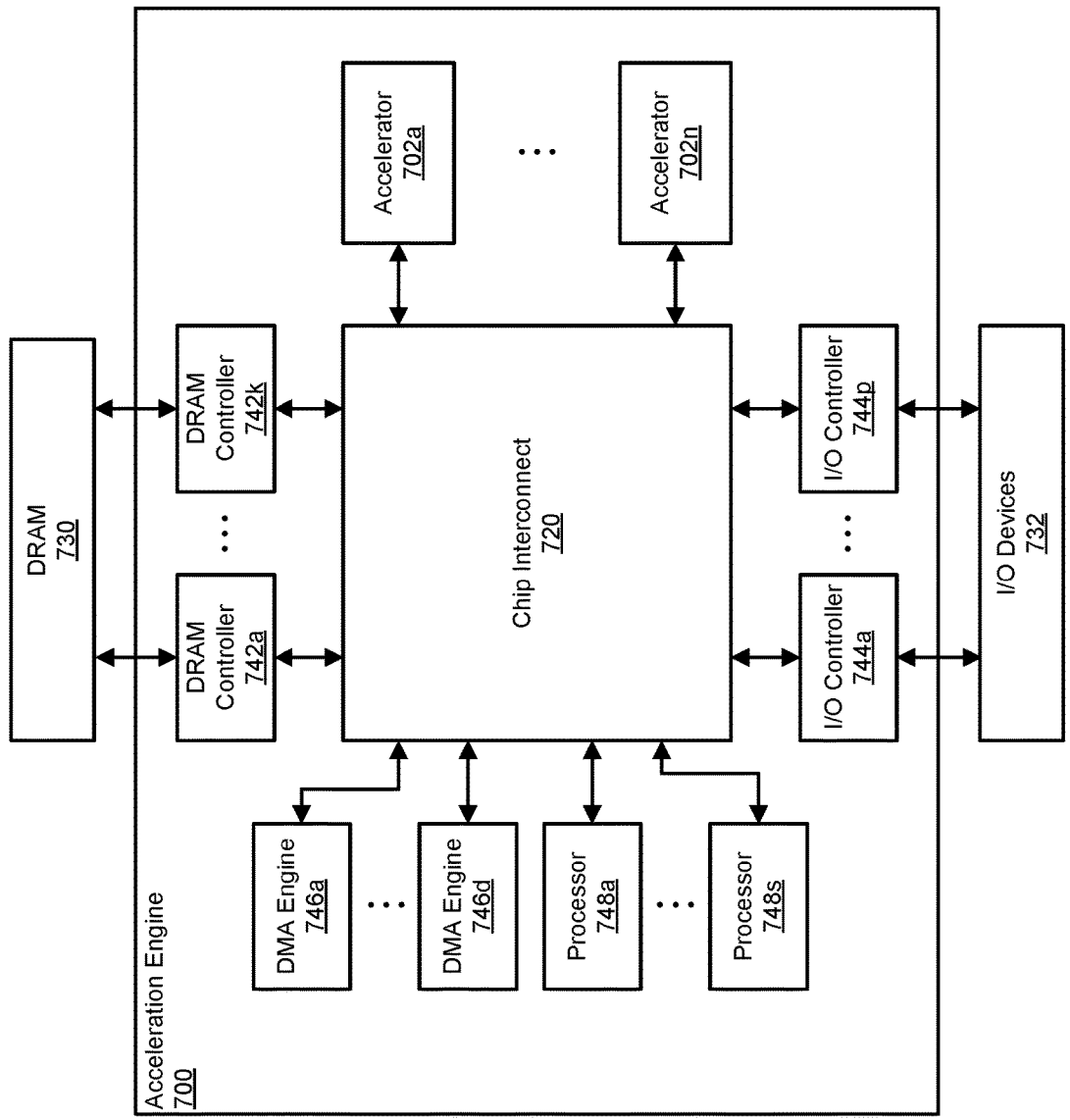
FIG. 7 illustrates a block diagram of an example of an acceleration engine.

FIG. 7 includes a block diagram that illustrates an example of an acceleration engine 700. The acceleration engine 700 is an example of an integrated circuit that can include one or more accelerators 702a-702n that may be similar to the accelerator illustrated in FIG. 6.

In the example of FIG. 7, the acceleration engine 700 includes multiple accelerators 702a-702n, each of which can perform a set of operations. In various examples, the accelerators 702a-702n are for particular types of operations, so that the accelerators 702a-702n can perform the operations much faster than when similar operations are performed by a general purpose processor. In various examples, to perform a set of operations, input data on which the operations are to be performed must first be moved into the accelerators 702a-702n. Additionally, in some cases, program code is also moved into the accelerators 702a-702n, which programs the operations that the accelerators 702a-702n will perform on the data. In the illustrated example, the acceleration engine 700 includes n accelerators 702a-702n. Examples of accelerators that can be included in the acceleration engine 700 include graphics accelerators, floating point accelerators, neural network accelerators, and others. In various examples, the accelerators 702a-702n can each be the same (e.g., each of the accelerators 702a-702n is a graphics accelerator) or can be different (e.g., the accelerators 702a-702n include a graphics accelerator, a floating point accelerator, and neural network accelerator).

The example acceleration engine 700 further includes DRAM controllers 742a-742k for communicating with an external memory. The external memory is implemented, in this example, using DRAM 730. In the illustrated example, the acceleration engine 700 includes k DRAM controllers 742a-742k, each of which may be able to communicate with an independent set of banks of DRAM. In other examples, other types of RAM technology can be used for the external memory. The DRAM controllers 742a-742k can also be referred to as memory controllers.

In various examples, input data and/or program code for the accelerators 702a-702n can be stored in the DRAM 730. Different programs can cause the accelerators 702a-702n to perform different operations. For example, when one of the accelerators is a neural network accelerator, one program can configure the neural network accelerator to perform speech recognition while another program can configure the neural network accelerator to perform image recognition. In various examples, different accelerators 702a-702n can be programmed with different programs, so that each performs a different set of operations. In various examples, the processors 748a-748s can manage moving of program code from the DRAM 730 to the accelerators 702a-702n.

The example acceleration engine 700 further includes I/O controllers 744a-744p for communicating with I/O devices 732 in the system. The acceleration engine 700 can communicate with I/O devices over, for example, a processor bus. In some examples, the processor bus can be implemented using Peripheral Component Interconnect (PCI) and/or a variation of the PCI bus protocol. The processor bus can connect the acceleration engine 700 to I/O devices such as, for example, input and output devices, memory controllers, storage devices, and/or network interface cards, among other things. In some examples, the I/O controllers 744-744p can enable the acceleration engine 700 to act as an I/O device for a host processor. For example, the acceleration engine 700 can be the recipient of input data from the host processor, and a command indicating an operation to be performed on the input data (e.g., a particular computation or analysis). In the illustrated example, the acceleration engine 700 includes p I/O controllers 744a-744p, each of which may include a separate root complex and may communicate with a separate set of I/O devices 732. In other examples, other standardized bus protocols, such as Ultra Path Interconnect (UPI) can be used for the host bus. In other examples, a proprietary bus protocol can be used.

Movement of data in the acceleration engine 700 can be managed by one or more processors 748a-748s, which can also be referred to as data management processors. In the example of FIG. 7, the acceleration engine 700 includes s processors 748a-748s incorporated into the device (e.g., on the same silicon die). In other examples, the processors 748a-748s can be external to the acceleration engine 700 (e.g., on a different die and/or in a different package). In some examples, the processors 748a-748s can manage the movement of data from I/O devices 732 to the accelerators 702a-702n or the DRAM 730. For example, input data may be located at an I/O device 732 or in processor memory, and the processors 748a-748s can move the input from the I/O device 732 or processor memory into an accelerator or into DRAM 730. As another example, program code for the accelerators 702a-702n may be located on an I/O device 732 or in processor memory.

The example acceleration engine 700 further includes DMA engines 746a-746d that can move data between the accelerators 702a-702n, DRAM controllers 742a-742k, and I/O controllers 744a-744p. In the illustrated example, the acceleration engine 700 includes d DMA engines 746a-746d. In some implementations, the DMA engines 746a-746d can be assigned to specific tasks, such as moving data from the DRAM controllers 742a-742d to the accelerators 702a-702n, or moving data between the I/O controllers 744a-744p and the accelerators 702a-702n. These tasks can be assigned, for example, by enqueuing descriptors with the DMA engines 746a-746d, where a descriptor identifies an address for a block of data and an operation (e.g., a read or a write) to perform. A descriptor, for example, can direct a DMA engine to instruct a DMA controller to read a block of data from DRAM 730. A descriptor can, as a further example, instruct the DMA engine to write data, read by the DMA controller, to an accelerator. Further descriptors can be used to move data from an accelerator to DRAM 730.

In various examples, each of the processors 748a-748s can be responsible for managing the data movement for a different accelerator. In some examples, a processor may manage the data movement for more than one accelerator. Similarly, in various examples, each of the processors 748a-748s can be assigned to one or more DMA engines 746a-746d. In these and other examples, associations between processors 748a-748s, accelerators 702a-702n, and DMA engines 746a-746d are determined by program code being executed by each respective processor.

In the example acceleration engine 700, the various components can communicate over a chip interconnect 720. The chip interconnect 720 primarily includes wiring for routing data between the components of the acceleration engine 700. In some cases, the chip interconnect 720 can include a minimal amount of logic, such as multiplexors to control the direction of data, flip-flops for handling clock domain crossings, and timing logic.

Figure 8:
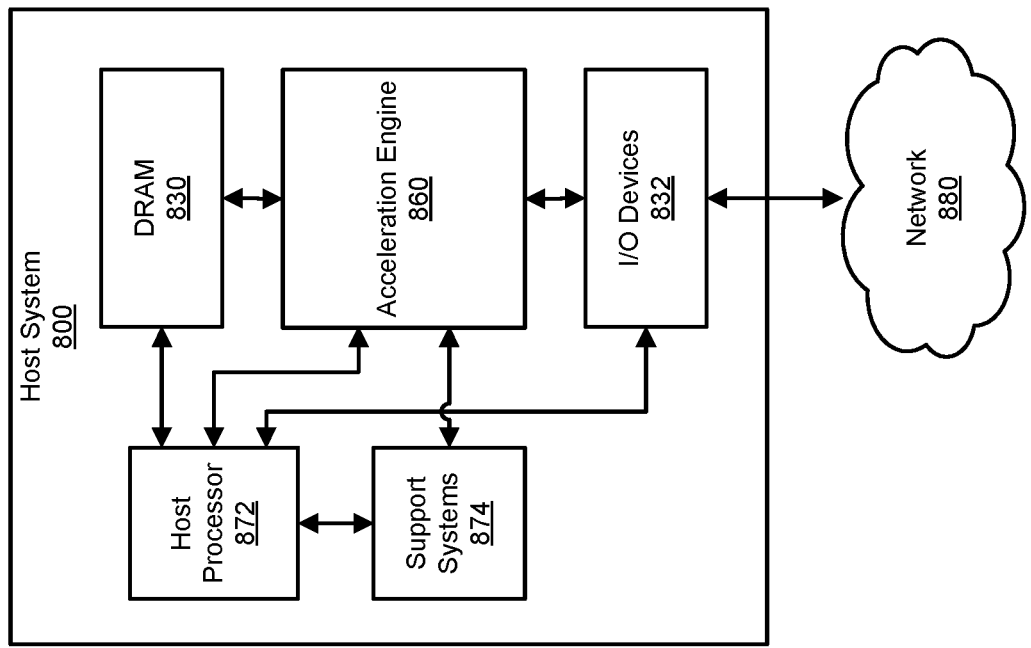
FIG. 8 illustrates a block diagram of an example of a host system.

FIG. 8 includes a block diagram that illustrates an example of a host system 800 in which an acceleration engine 860 can be used. The acceleration engine 860 of FIG. 8 is an example of a device that can include one or more accelerators such as is illustrated in FIG. 7. The example host system 800 of FIG. 8 includes the acceleration engine 860, a host processor 872, DRAM 830 or processor memory, I/O devices 832, and support systems 874. In various implementations, the host system 800 can include other hardware that is not illustrated here.

The host processor 872 is a general purpose integrated circuit that is capable of executing program instructions. In some examples, the host processor 872 can include multiple processing cores. A multi-core processor may include multiple processing units within the same processor. In some examples, the host system 800 can include more than one host processor 872. In some examples, the host processor 872 and the acceleration engine 860 can be one chip, such as, one or more integrated circuits within the same package.

In various examples, the host processor 872 can communicate with other components in the host system 800 over one or more communication channels. For example, the host system 800 can include a host processor bus, which the host processor 872 can use to communicate with the DRAM 830, for example. As another example, the host system 800 can include an I/O bus, such as a PCI-based bus, over which the host processor 872 can communicate with the acceleration engine 860 and/or the I/O devices 832, for example. In various examples, the host system 800 can, alternatively or additionally, include other communication channels or busses, such as serial busses, power management busses, storage device busses, and so on.

In some examples, software programs executing on the host processor 872 can receive or generate input for processing by the acceleration engine 860. In some examples, the programs can select an appropriate neural network to execute for a given input. For example, a program may be for language translation, and can select one or more neural networks capable of speech recognition and/or machine translation. In these and other examples, the programs can configure the acceleration engine 860 with the neural network to execute, and/or can select a neural network processing engine on the acceleration engine 860 that has previously been configured to execute the desired neural network. In some examples, once the acceleration engine 860 has started an inference on input data, the host processor 872 can manage the movement of data (such as weights, instructions, intermediate results, results of conditional layers, and/or final results) into or out of the acceleration engine 860.

In some examples, a software program that is using the acceleration engine 860 to conduct an inference can read the result from a conditional layer from the acceleration engine 860 and/or from a storage location, such as in DRAM 830. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 830 is memory that is used by the host processor 872 for storage of program code that the host processor 872 is in the process of executing, as well as values that are being operated on. In some examples, the data for a neural network (e.g., weight values, instructions, and other data) can be all or partially stored in the DRAM 830. DRAM is a common term for processor memory, and though DRAM is volatile memory, processor memory can be volatile and/or non-volatile. Though not illustrated here, the host system 800 can include other volatile and non-volatile memories for other purposes. For example, the host system 800 can include a Read-Only Memory (ROM) that stores boot code for booting the host system 800 at power on, and/or Basic Input/Output System (BIOS) code.

Though not illustrated here, the DRAM 830 can store instructions for various programs, which can be loaded into and be executed by the host processor 872. For example, the DRAM 830 can be storing instructions for an operating system, one or more data stores, one or more application programs, one or more drivers, and/or services for implementing the features disclosed herein.

The operating system can manage and orchestrate the overall operation of the host system 800, such as scheduling tasks, executing applications, and/or controller peripheral devices, among other operations. In some examples, a host system 800 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 800. For example, some drivers can provide communication between the operating system and peripheral devices or I/O devices 832. Alternatively or additionally, some drivers may provide communication between application programs and the operating system, and/or application programs and peripheral devices accessible to the host system 800. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 832 can include hardware for connecting to user input and output devices, such as keyboards, mice, pens, tablets, voice input devices, touch input devices, displays or monitors, speakers, and printers, among other devices. The I/O devices 832 can also include storage drives and/or network interfaces for connecting to a network 880. For example, the host system 800 can use a network interface to communicate with storage devices, user terminals, other computing devices or servers, and/or other networks, among various examples.

In various examples, one or more of the I/O devices 832 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 800 or may be in an external enclosure. A storage device can be fixed (e.g., attached by screws) or removable (e.g., having a physical release mechanism and possibly a hot-plug mechanism).

Storage devices, the DRAM 830, and any other memory component in the host system 800 are examples of computer-readable storage media. Computer-readable storage media are physical mediums that are capable of storing data in a format that can be read by a device such as the host processor 872. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 832 can be PCI-based devices. In these examples, a PCI-based I/O device includes a PCI interface for communicating with the host system 800. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 874 can include hardware for coordinating the operations of the acceleration engine 860. For example, the support systems 874 can include a microprocessor that coordinates the activities of the acceleration engine 860, including moving data around on the acceleration engine 860. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 872. In some examples, the program executed by the microprocessor is stored on the hardware of microprocessor, or on a non-volatile memory chip in the host system 800. In some examples, the microprocessor and the acceleration engine 860 can be on chip, such as one integrated circuit on the same die and in the same package.

In some examples, the support systems 874 can be responsible for taking instructions from the host processor 872 when programs executing on the host processor 872 request the execution of a neural network. For example, the host processor 872 can provide the support systems 874 with a set of input data and a task that is to be performed on the set of input data. In this example, the support systems 874 can identify a neural network that can perform the task, and can program the acceleration engine 860 to execute the neural network on the set of input data. In some examples, the support systems 874 only needs to select an appropriate neural network processing engine of the neural network processor. In some examples, the support systems 874 may need to load the data for the neural network onto the acceleration engine 860 before the acceleration engine 860 can start executing the neural network. In these and other examples, the support systems 874 can further receive the output of executing the neural network, and provide the output back to the host processor 872.

In some examples, the operations of the support systems 874 can be handled by the host processor 872. In these examples, the support systems 874 may not be needed and can be omitted from the host system 800.

In various examples, the host system 800 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 800 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A neural network processor comprising:
  a processing engine array;
  a state buffer memory represented as an array of memory blocks arranged in rows and columns, the state buffer memory having:
    a first memory region allocated for storing computational data for loading into the processing engine array, wherein the first memory region is accessed using a first address map; and
    a second memory region allocated for a scratchpad memory, the second memory region corresponding to a set of one or more end columns of memory blocks,
  wherein the second memory region is accessed using a second address map; and
    an address translation circuit operable to translate a target address of an access request for accessing the scratchpad memory by transposing a first portion of the target address that addresses different rows of memory blocks of the state buffer memory with an inversion of a second portion of the target address that addresses different rows of memory blocks of the state buffer memory.

2. The neural network processor of claim 1, wherein the first address map increments starting addresses of the memory blocks sequentially along each row, and the second address map increments the starting addresses of the memory blocks sequentially along each column.

3. The neural network processor of claim 1, wherein a size of the scratchpad memory is adjusted for different neural network layers of a neural network model, or for different neural network models.

4. The neural network processor of claim 1, wherein write protection is applied to the state buffer memory to prevent access requests with target addresses associated with the first address map from writing to the second memory region, and to prevent access requests with target addresses associated with the second address map from writing to the first memory region.

5. An integrated circuit device comprising:
a memory represented as an array of memory blocks arranged in rows and columns, and including memory locations that are mapped to both a first address range and a second address range, the second address range being non-overlapping with the first address range; and
an address translation circuit operable to:
receive a first access request having a first target address belonging to the first address range, wherein the first address range is mapped to the memory with starting addresses of the memory blocks incrementing sequentially along each row;
provide the first target address as a first memory address to access the memory;
receive a second access request having a second target address belonging to the second address range, wherein the second address range is mapped to the memory with the starting addresses of the memory blocks incrementing sequentially along each column; and
translate the second target address into a second memory address to access the memory.

6. The integrated circuit device of claim 5, wherein the second address range starts at a memory block corresponding to a last memory block of a first row of the memory.

7. The integrated circuit device of claim 5, wherein the second target address is translated into the second memory address by transposing a first portion of the second target address that addresses different rows of memory blocks of the memory with an inversion of a second portion of the second target address that addresses different columns of memory blocks of the memory.

8. The integrated circuit device of claim 5, wherein the second target address is translated into the second memory address by transposing a first portion of the second target address that addresses different rows of memory blocks of the memory with a result of applying an offset to an inversion of a second portion of the second target address that addresses different columns of memory blocks of the memory.

9. The integrated circuit device of claim 5, wherein the memory includes a contiguous region allocated for a scratchpad memory.

10. The integrated circuit device of claim 9, wherein the scratchpad memory corresponds to a set of one or more end columns of memory blocks in the memory.

11. The integrated circuit device of claim 10, wherein the scratchpad memory is accessed using the second address range.

12. The integrated circuit device of claim 10, wherein a size of the scratchpad memory is dynamically adjustable.

13. The integrated circuit device of claim 12, wherein the integrated circuit device is operable to prevent write accesses to the memory using an upper portion of the second address range that exceeds the size of the scratchpad memory.

14. The integrated circuit device of claim 9, further comprising a processing engine array, wherein the memory is communicatively coupled between the address translation circuit and the processing engine array.

15. The integrated circuit device of claim 14, wherein data for loading into the processing engine array are accessed using the first address range.

16. A method for accessing a memory represented as an array of memory blocks arranged in rows and columns, the method comprising:
receiving a first access request having a first target address belonging to a first address range, wherein the first address range is mapped to the memory with starting addresses of the memory blocks incrementing sequentially along each row, the memory including memory locations that are mapped to both the first address range and a second address range;
providing the first target address as a first memory address to access the memory;
receiving a second access request having a second target address belonging to the second address range, wherein the second address range is mapped to the memory with the starting addresses of the memory blocks incrementing sequentially along each column, the second address range being non-overlapping with the first address range; and
translating the second target address into a second memory address to access the memory.

17. The method of claim 16, wherein translating the second target address includes transposing a first portion of the second target address that addresses different rows of memory blocks of the memory with an inversion of a second portion of the second target address that addresses different columns of memory blocks of the memory.

18. The method of claim 16, wherein the memory includes a scratchpad region corresponding to a set of one or more end columns of memory blocks in the memory.

19. The method of claim 18, wherein the scratchpad region is accessed using addresses below a threshold address in the second address range.

20. The method of claim 19, further comprising:
applying write protection to prevent write accesses to the memory using addresses at or above the threshold address in the second address range.

21. The method of claim 19, further comprising:
adjusting a size of the scratchpad region by adjusting the threshold address.

* * * * *